(12) United States Patent
Wang et al.

(10) Patent No.: US 11,916,246 B2
(45) Date of Patent: Feb. 27, 2024

(54) BATTERY PACK

(71) Applicant: Contemporary Amperex Technology Co., Limited, Ningde (CN)

(72) Inventors: Qing Wang, Ningde (CN); Peng Wang, Ningde (CN); Shengjie Hu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 216 days.

(21) Appl. No.: 16/963,478

(22) PCT Filed: Jan. 14, 2019

(86) PCT No.: PCT/CN2019/071605
§ 371 (c)(1),
(2) Date: Jul. 20, 2020

(87) PCT Pub. No.: WO2019/141149
PCT Pub. Date: Jul. 25, 2019

(65) Prior Publication Data
US 2021/0050566 A1 Feb. 18, 2021

(30) Foreign Application Priority Data
Jan. 22, 2018 (CN) .......................... 201820101847.2

(51) Int. Cl.
*H01M 50/24* (2021.01)
*H01M 10/42* (2006.01)
(Continued)

(52) U.S. Cl.
CPC ......... *H01M 50/24* (2021.01); *H01M 10/425* (2013.01); *H01M 50/209* (2021.01);
(Continued)

(58) Field of Classification Search
None
See application file for complete search history.

(56) References Cited

U.S. PATENT DOCUMENTS

| 2018/0198110 A1* | 7/2018 | Zeng | H05K 1/028 |
| 2019/0372079 A1* | 12/2019 | Nakamoto | H01M 50/20 |

FOREIGN PATENT DOCUMENTS

| CN | 206806417 U | 12/2017 |
| CN | 208127288 U | 11/2018 |

(Continued)

OTHER PUBLICATIONS

PCT International Search Report for PCT/CN2019/071605, dated Apr. 12, 2019, 13 pages.

(Continued)

*Primary Examiner* — Carmen V Lyles-Irving
(74) *Attorney, Agent, or Firm* — East IP P.C.

(57) ABSTRACT

The present disclosure discloses a battery pack, including a plurality of battery modules. Each battery module includes: a battery row including a plurality of battery cells, each battery cell includes two electrodes and electrodes of all battery cells form two electrode rows arranging in the longitudinal direction; a flexible printed circuit board located between the two electrode rows; and two conductive connecting plate rows located on two sides of the flexible printed circuit board in the transverse direction respectively, each conductive connecting plate row includes a plurality of conductive connecting plates arranged in the longitudinal direction and spaced apart from each other, and each conductive connecting plate is electrically connected to the flexible printed circuit board and a corresponding electrode of a corresponding electrode row. Each battery module (Continued)

further includes an insulation cover covering and fixed to a top of the battery row to insulate each battery module from outside.

12 Claims, 7 Drawing Sheets

(51) Int. Cl.
 H01M 50/262 (2021.01)
 H01M 50/278 (2021.01)
 H01M 50/284 (2021.01)
 H01M 50/209 (2021.01)
 H01M 50/505 (2021.01)

(52) U.S. Cl.
 CPC ....... *H01M 50/262* (2021.01); *H01M 50/278* (2021.01); *H01M 50/284* (2021.01); *H01M 50/505* (2021.01)

(56) References Cited

FOREIGN PATENT DOCUMENTS

| DE | 102012219784 A1 | 4/2014 |
| EP | 2437329 A1 | 4/2012 |
| TW | I608768 B | 12/2017 |
| WO | 2015118597 A1 | 8/2015 |
| WO | 2017198423 A1 | 11/2017 |

OTHER PUBLICATIONS

The extended European search report for EP Application No. 19741324.8, dated Dec. 21, 2020, 8 pages.
The extended European search report dated Sep. 6, 2022 for European Application No. 22168292.5, 9 pages.

* cited by examiner

BATTERY PACK

CROSS-REFERENCE TO RELATED APPLICATIONS

This application is a National Stage of International Application No. PCT/CN2019/071605, filed Jan. 14, 2019, which claims priority to Chinese Patent Application No. 201820101847.2, filed Jan. 22, 2018, both of which are hereby incorporated by reference in their entireties.

TECHNICAL FIELD

The present disclosure relates to the field of a battery, and in particular relates to a battery pack.

BACKGROUND

As higher requirements are imposed on an energy density of a power battery, an assembly method of a battery pack has been transformed up to date. A megatrend of the battery pack is large battery cells, large battery modules, and no independent module container for an individual battery module, so as to achieve a high energy density.

Because a separator in the individual battery module and the module container are cancelled, overall safety of the battery pack is reduced. Especially, there is no necessary high-voltage protection unit for a conductive connecting plate and a battery pack container, there is a considerable risk during an assembly operation or use of the battery pack. Currently, a common practice is to use an integral plastic sheet to cover the top of the large battery module to provide a protection of insulation from the battery pack container. This practice is adverse to maintenance and protection of the individual module, and leads to a lack of insulation protection between adjacent modules.

SUMMARY

In view of the problems in the prior art, an objection of the present disclosure is to provide a battery pack, which may implement insulation protection between conductive components and a battery pack container. Also, the battery pack is used more independently and facilitates protection and repair of an individual battery module.

To achieve the above objection, the present disclosure discloses a battery pack, including a plurality of battery modules. Each battery module includes: a battery row, including a plurality of battery cells arranged in a longitudinal direction, each battery cell includes two electrodes with opposite polarities, and electrodes of all battery cells of the battery row form two electrode rows arranging in the longitudinal direction; a flexible printed circuit board extending in the longitudinal direction and located between the two electrode rows of the battery row; and two conductive connecting plate rows located on two sides of the flexible printed circuit board in a transverse direction respectively, each conductive connecting plate row includes a plurality of conductive connecting plates arranged in the longitudinal direction and spaced apart from each other, and each conductive connecting plate in each conductive connecting plate row is electrically connected to the flexible printed circuit board and electrically connected to a corresponding electrode of a corresponding electrode row. Each battery module further includes an insulation cover, covering and fixed to a top of the battery row to insulate each battery module from outside.

Beneficial effects of the present disclosure are as follows: in the battery pack according to the present disclosure, the design of the insulation cover of each battery module ensures insulation between the conductive components of each battery module and the battery pack container; meanwhile, an individual battery module is used more independently, and is universally applicable, thereby effectively enabling repair and protection of the individual battery module in the battery pack.

REFERENCE NUMERALS

Figure 1:
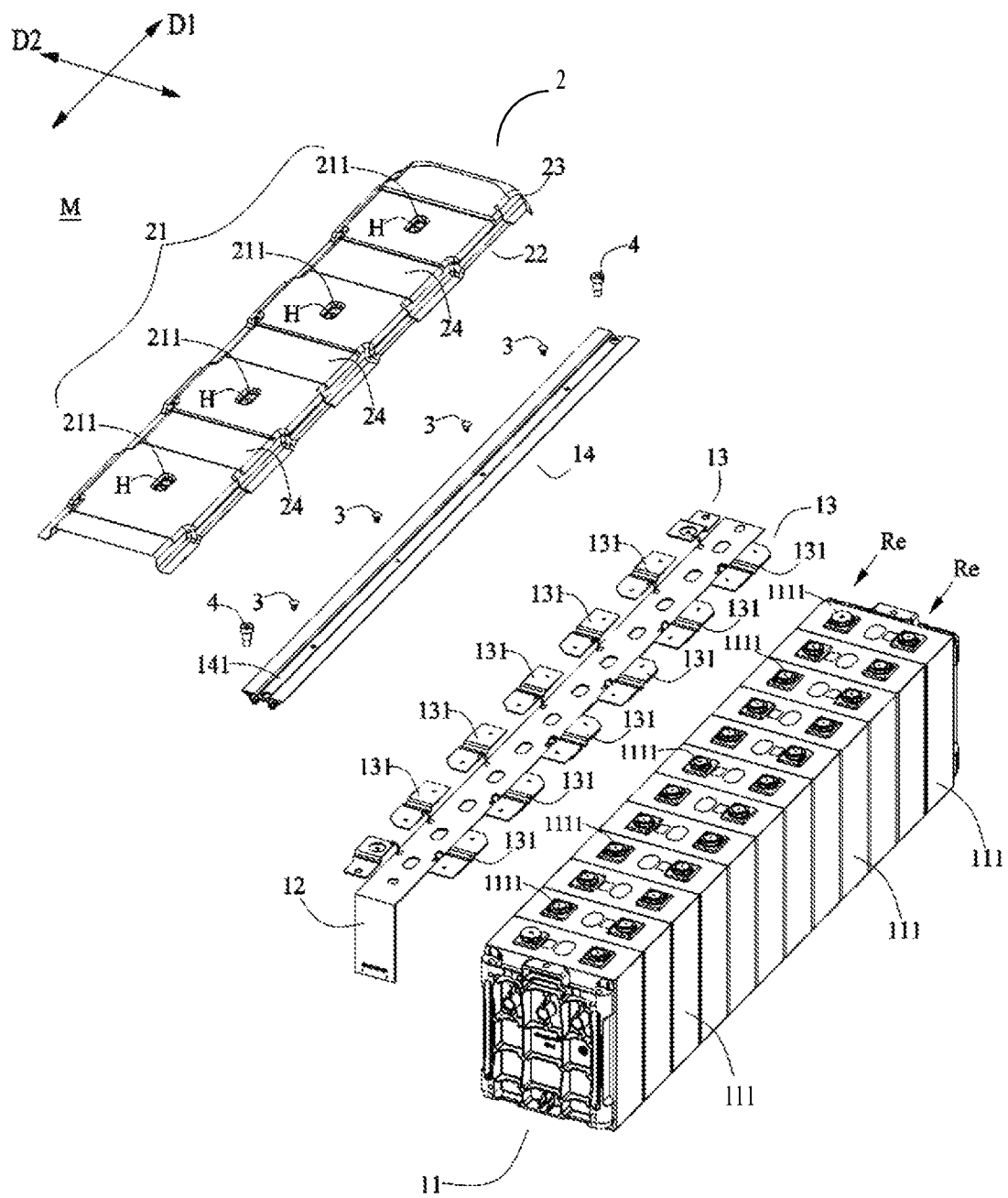
FIG. 1 is an exploded perspective view of an embodiment of each battery module in a battery pack according to the present disclosure.
Figure 2:
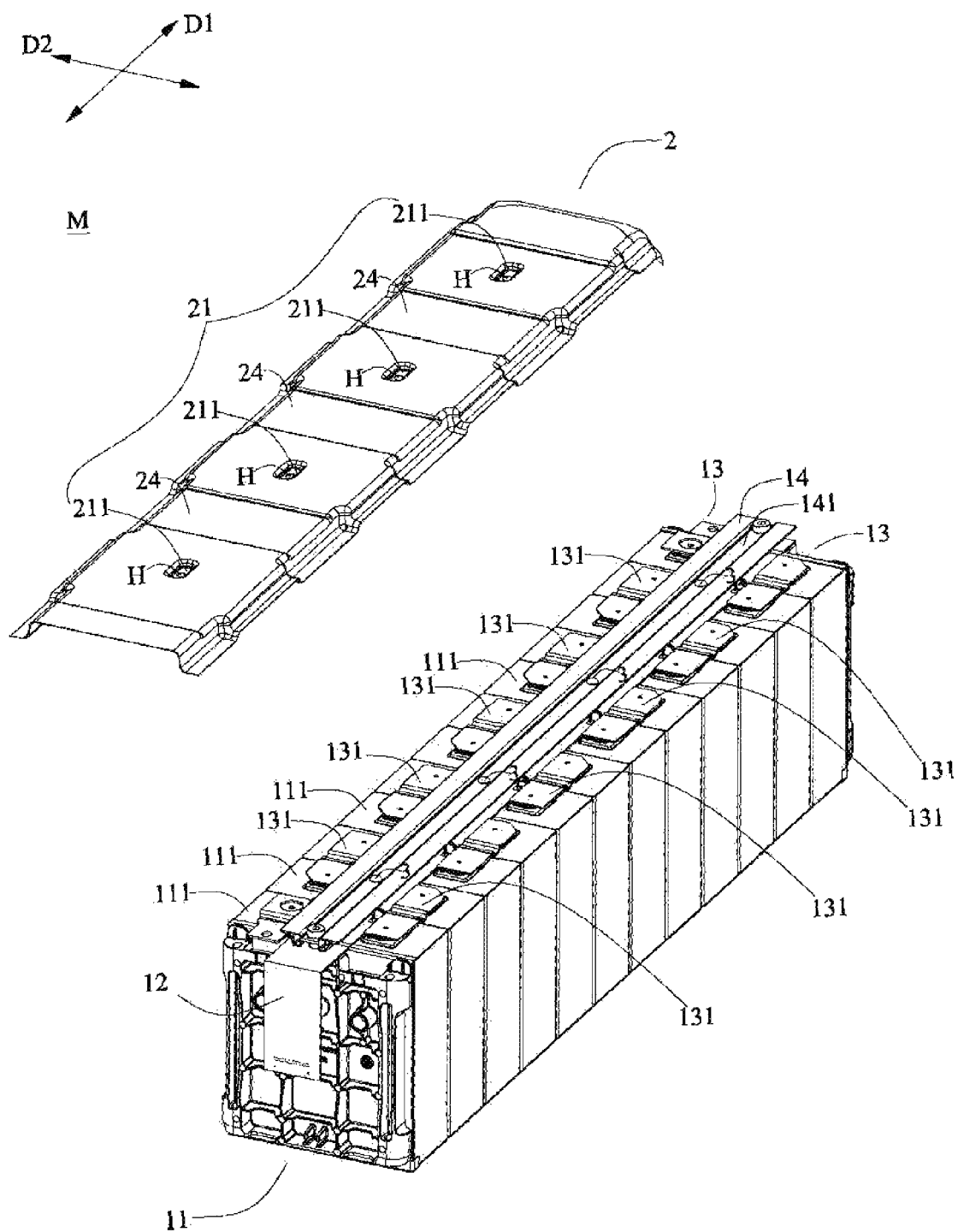
FIG. 2 is an assembly diagram of FIG. 1 in which, for clarity, an insulation cover is not assembled.
Figure 3:
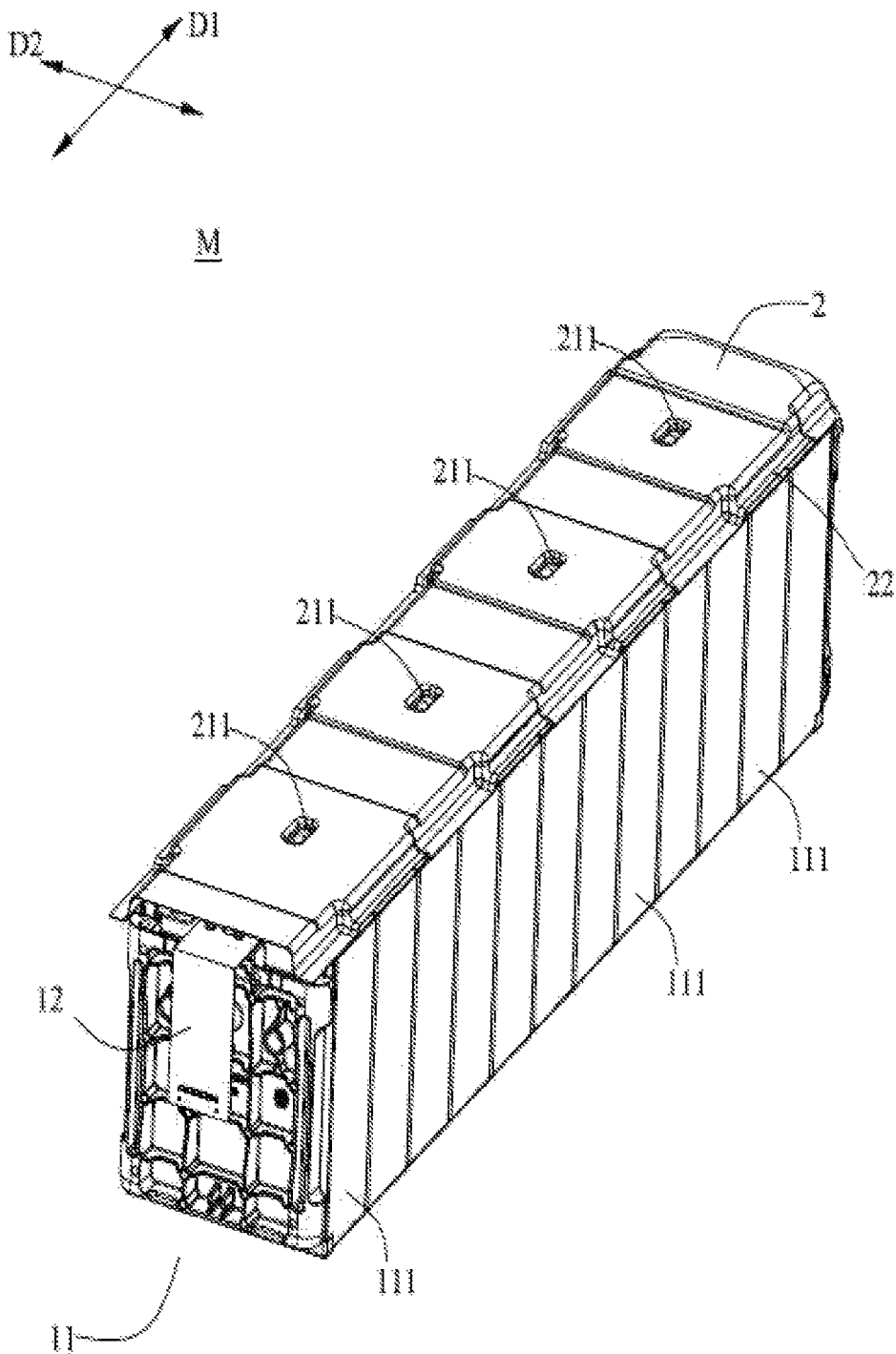
FIG. 3 is a further assembly diagram of FIG. 2.
Figure 4:
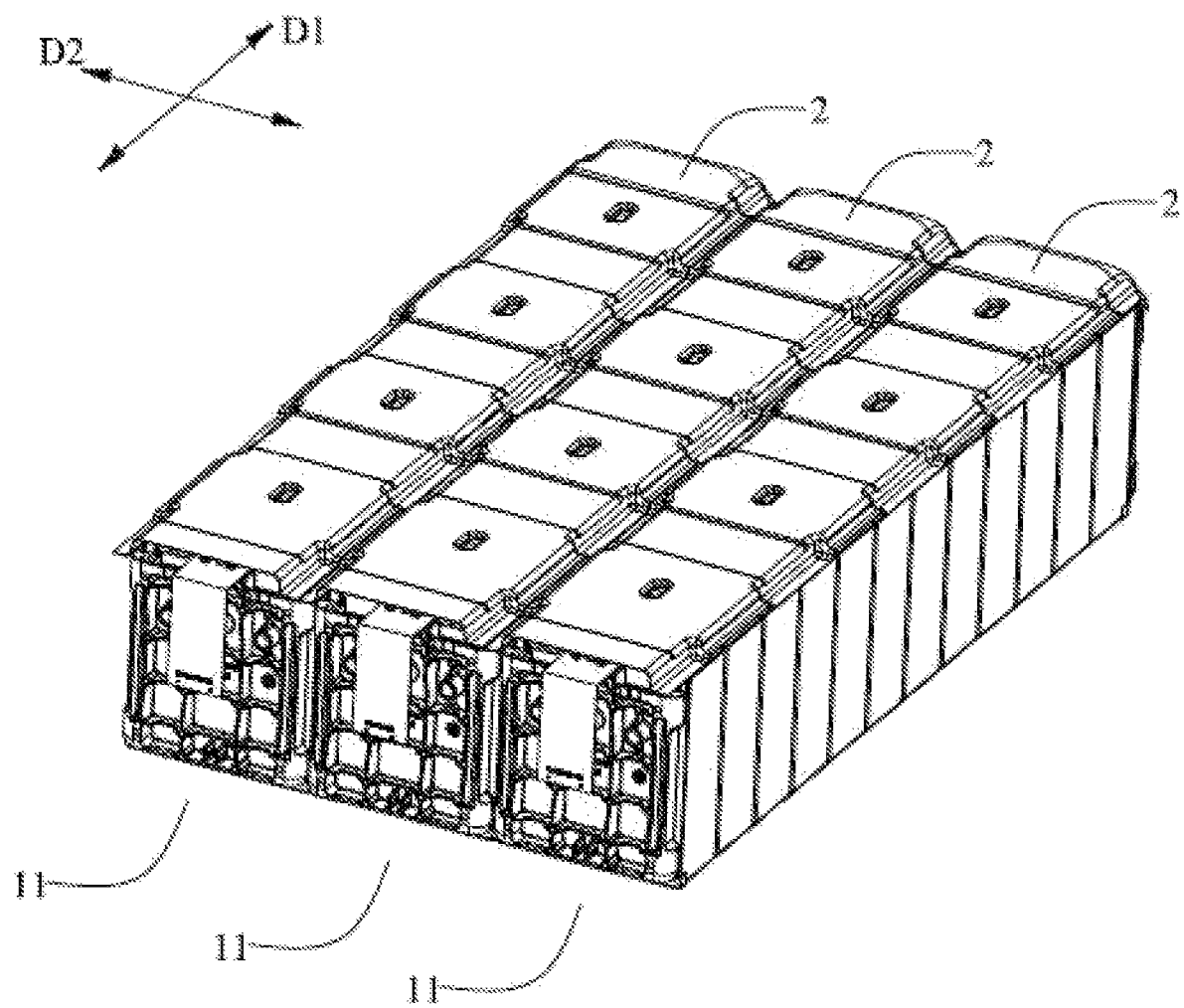
FIG. 4 is a perspective view of a battery pack by assembling the battery module shown in FIG. 3.

D1: Longitudinal direction
D2: Transverse direction
M: Battery module
11: Battery row
111: Battery cell
1111: Electrode
Re: Electrode row
12: Flexible printed circuit board
13: Conductive connecting plate row
131: Conductive connecting plate
14: Insulation batten
141: Inner recessed channel
2: Insulation cover
21: Groove row
211: Groove
H: Fixing hole
22: Lateral edge part
23: Rear edge part
24: Reinforcing recess
25: Positioning slot
26: Lateral part
3: Snapping member
4: Positioning screw

DESCRIPTION OF EMBODIMENTS

A battery pack according to the present disclosure is described in detail below with reference to accompanying drawings.

As shown in FIG. 1 to FIG. 7, the battery pack according to the present disclosure includes a plurality of battery modules M. Each battery module M includes: a battery row 11, including a plurality of battery cells 111 arranged in a longitudinal direction D1, wherein each battery cell 111 includes two electrodes 1111 with opposite polarities, and electrodes 1111 of all battery cells 111 of the battery row 11 form two electrode rows Re arranging in the longitudinal direction D1; a flexible printed circuit board 12 extending in the longitudinal direction D1 and located between the two electrode rows Re of the battery row 11; and two conductive connecting plate rows 13 located on two sides of the flexible printed circuit board 12 in a transverse direction D2 respectively, wherein each conductive connecting plate row 13 includes a plurality of conductive connecting plates 131 arranged in the longitudinal direction D1 and spaced apart from each other, and each conductive connecting plate 131 in each conductive connecting plate row 13 is electrically connected to the flexible printed circuit board 12 and electrically connected to a corresponding electrode 1111 of a corresponding electrode row Re. Each battery module M further includes: an insulation cover 2, covering and fixed to a top of the battery row 11 to insulate each battery module M from outside.

In the battery pack according to the present disclosure, the design of the insulation cover 2 of each battery module M ensures insulation between the conductive components (the flexible printed circuit board 12 and the conductive connecting plate 131) of each battery module and the battery pack container (not shown). In addition, the independent design of the insulation cover 2 of each battery module M makes an individual battery module M more independent and universally applicable, thereby effectively enabling repair and protection of the individual battery module M in the battery pack.

Specifically, as shown in FIG. 1, each battery module M further includes: an insulation batten 14 extending in the longitudinal direction D1 and fixed onto the flexible printed circuit board 12, wherein each insulation cover 2 is fixed onto a corresponding insulation batten 14. Each insulation cover 2 is directly fixed onto the corresponding insulation batten 14, thereby preventing the insulation cover 2 from crushing the flexible printed circuit board 12.

Each insulation batten 14 is provided with an inner recessed channel 141 extending in the longitudinal direction D1 of the insulation batten 14; each insulation cover 2 is provided with a groove row 21, the groove row 21 is aligned with the inner recessed channel 141 of a corresponding insulation batten 14 and includes a plurality of grooves 211 arranged in the longitudinal direction D1 and spaced apart from each other, and each groove 211 is provided with a fixing hole H extending through the groove 211 in an up-down direction; each battery module M further includes a plurality of snapping members 3, each snapping member 3 passes through the fixing hole H of a corresponding groove 211 and is fixed to the inner recessed channel 141 of the insulation batten 14 in a snap-fit manner. In this way, each insulation cover 2 is firmly fixed onto the corresponding insulation batten 14. In addition, such fixing manner facilitates the assembly of the battery module M, and thus facilitates assembling into a battery pack, thereby improving assembly efficiency of the battery pack.

In an embodiment, as shown in FIG. 1 to FIG. 4, each insulation cover 2 includes two lateral edge parts 22 located on two sides of the insulation cover 2 in a transverse direction D2 and extending outward and downward respectively, and the two lateral edge parts 22 cover exteriors of two conductive connecting plate rows 13 of a corresponding battery row 11. The lateral edge part 22 is configured to provide an insulation protection for two adjacent conductive connecting plate rows 13 of two adjacent battery modules M of the battery pack, thereby effectively avoiding a short circuit between the two adjacent conductive connecting plate rows 13, and further improving safety of the battery pack.

In the above embodiment, each insulation cover 2 further includes a rear edge part 23, located at a rear side of the insulation cover 2 in a longitudinal direction D1 and extending outward and downward, and the rear edge part 23 covers a rear side of a corresponding battery row 11 in the longitudinal direction D1. The rear edge part 23 covers a rear side of the corresponding battery module M in the longitudinal direction D1, thereby ensuring insulation between the rear side of the flexible printed circuit board 12 in the longitudinal direction D1 of the battery module M and the battery pack container.

In the foregoing embodiment, referring to FIG. 1 to FIG. 4, the insulation cover 2 further includes a plurality of reinforcing recesses 24 arranged in the longitudinal direction D1, and each reinforcing recess 24 is located between two adjacent grooves 21 may 1 of each groove row 21 and recessed downward from an outer surface of the insulation cover 2. The reinforcing recess 24 improve anti-impact strength of the insulation cover 2 and improve anti-deformation capability of the insulation cover 2. In the present embodiment, the insulation cover 2 is formed by plastic sucking molding, and correspondingly, a thickness of the insulation cover 2 is in a range of 0.5 mm to 0.7 mm. The material of the plastic sucking molded insulation cover 2 is one of Polypropylene (PP) and Polyethylene Terephthalate (PET). The thickness and the material of the insulation cover 2 greatly reduce a weight of the insulation cover 2, and thus improve an energy density of the battery pack; meanwhile, the insulation cover 2 is easy to form and convenient to assemble, thereby reducing cost of the battery pack.

Figure 5:
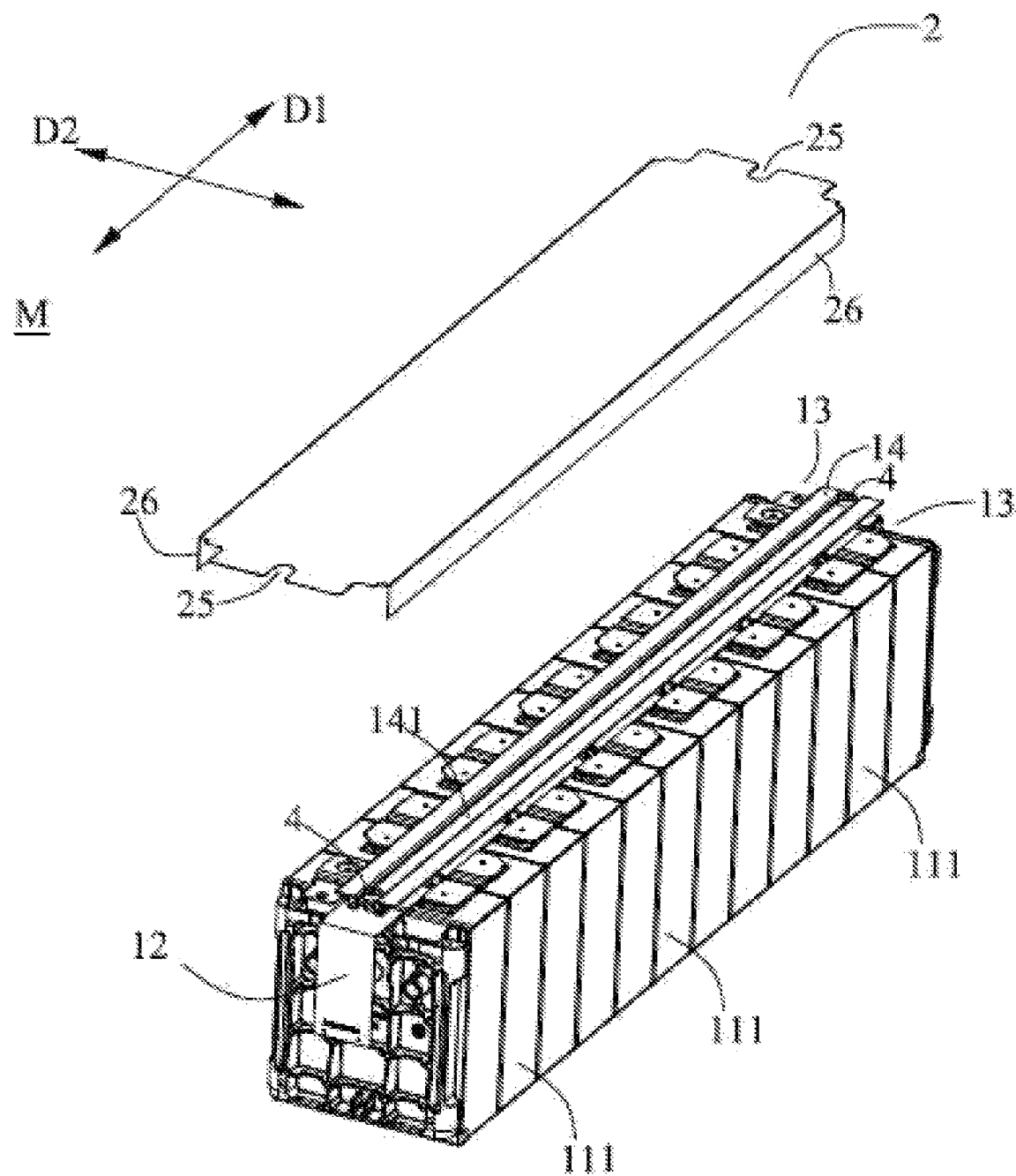
FIG. 5 is an assembly diagram of each battery module of a battery pack according to another embodiment of the present disclosure in which, for clarity, the insulation cover is not assembled.
Figure 6:
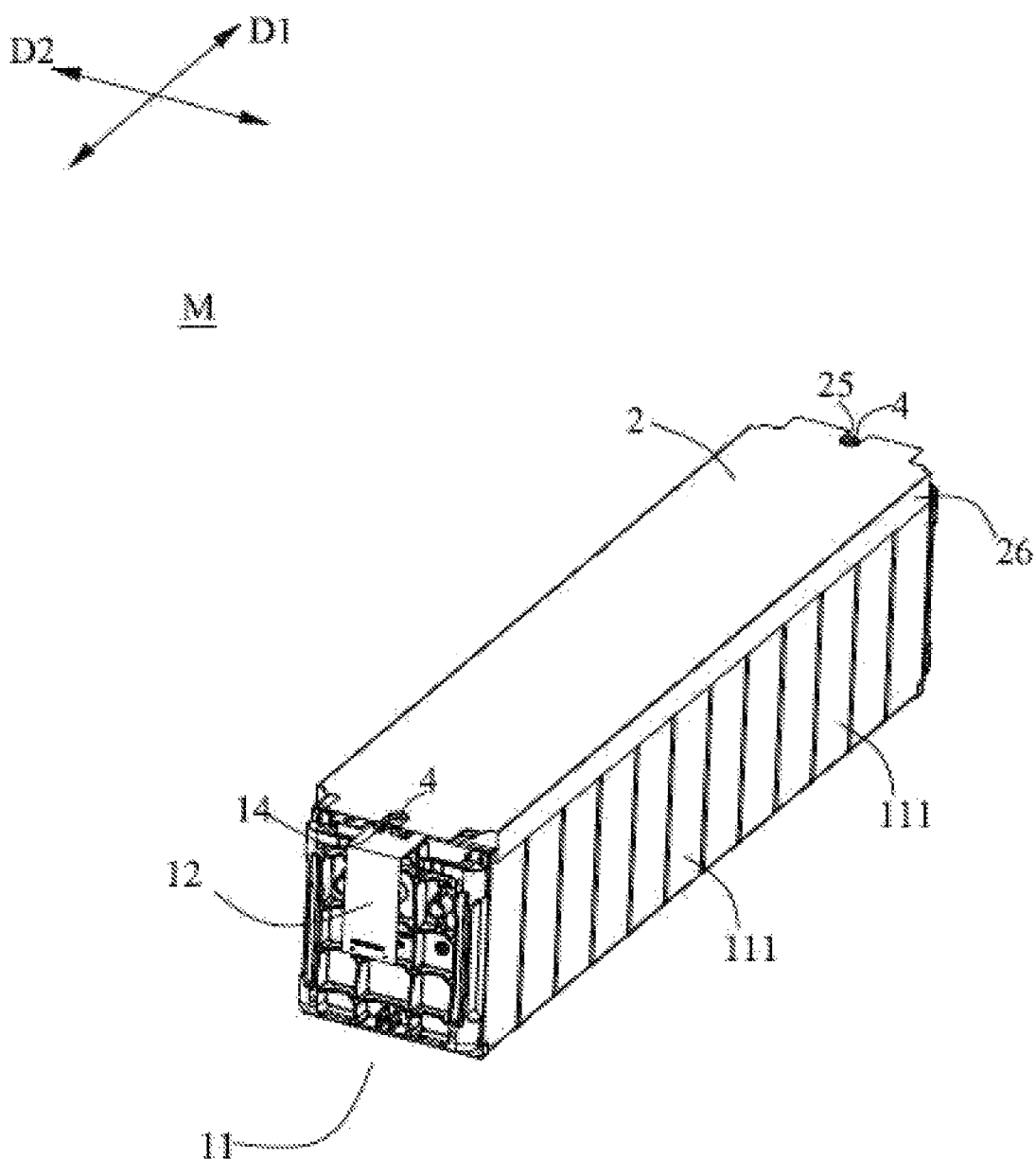
FIG. 6 is a further assembly diagram of FIG. 5.
Figure 7:
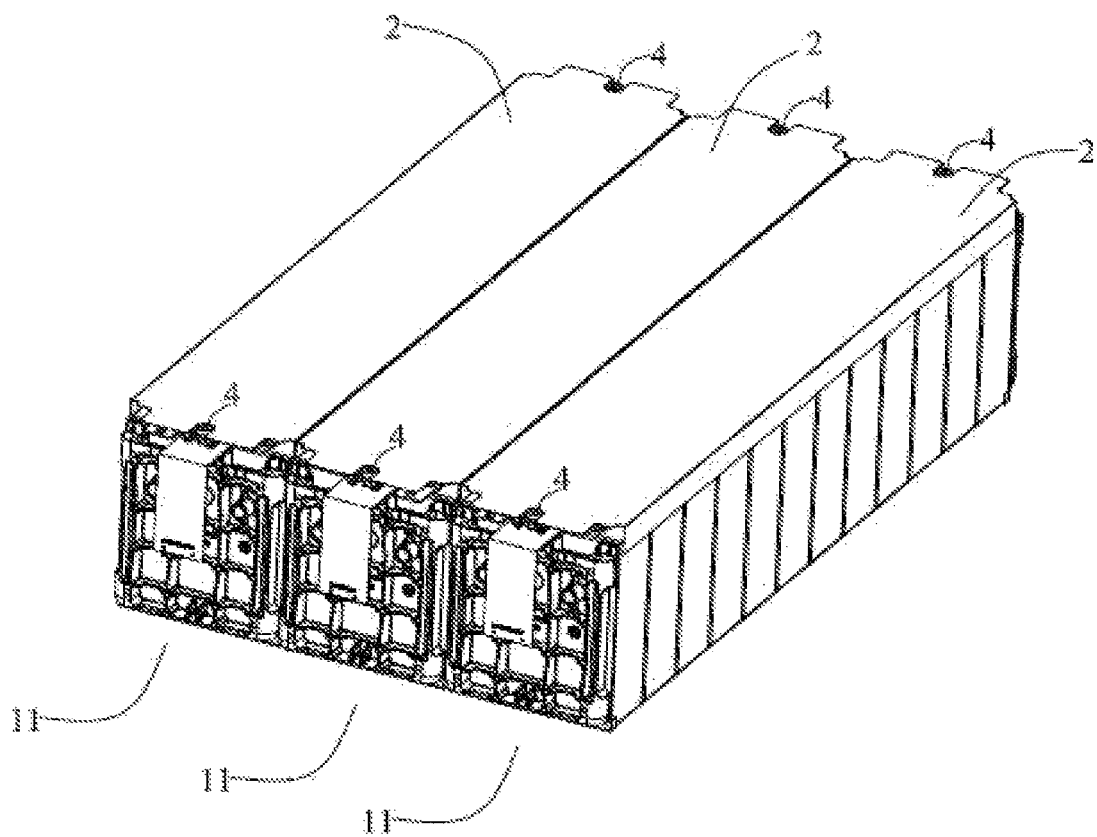
FIG. 7 is a perspective view of a battery pack by assembling the battery module shown in FIG. 6.

In the battery pack according to the present disclosure, in another embodiment, as shown in FIG. 5 to FIG. 7, each insulation batten 14 is provided with an inner recessed channel 141 extending in the longitudinal direction D1 of the insulation batten 14; each insulation cover 2 includes two positioning slots 25 located on two sides of the insulation cover 2 in the longitudinal direction D1 and recessed inward from side edges of the insulation cover 2 respectively, wherein each positioning slot 25 is aligned with the inner recessed channel 141 of a corresponding insulation batten 14; and each battery module M further includes two positioning screws 4 passing through two sides of the inner recessed channel 141 of the insulation batten 14 of the battery module M in the longitudinal direction D1 and fixed onto the flexible printed circuit board 12, and a top of each positioning screw 4 protrudes from an upper surface of the insulation batten 14; wherein each positioning screw 4 is engaged with a corresponding positioning slot 25 of the insulation cover 2 to position the insulation cover 2 between corresponding two positioning screws 4. The two positioning screws 4 are configured to effectively clamp and position the insulation cover 2, and are easy to assemble and easy to operate, thereby improving assembly efficiency and reducing production cost.

In the foregoing embodiment, the insulation cover 2 is fixed onto the corresponding insulation batten 14 by using an adhesive, thereby ensuring position stability of the insulation cover 2.

Referring to FIG. 5 to FIG. 7, each insulation cover 2 includes two lateral parts 26 located on two sides of the insulation cover 2 in a transverse direction D2 and extending downward respectively, and the two lateral parts 26 cover exteriors of two conductive connecting plate rows 13 of a corresponding battery row 11. The lateral part 26 is configured to provide an insulation protection for two adjacent conductive connecting plate rows 13 of two adjacent battery modules M of the battery pack, thereby effectively avoiding a short circuit between the two adjacent conductive connecting plate rows 13 and improving safety of the battery pack.

In the embodiments shown in FIG. 5 to FIG. 7, the insulation cover 2 is formed by hot-press molding, and correspondingly, a thickness of the insulation cover 2 is in a range of 0.25 mm to 1 mm. The material of the hot-press molded insulation cover 2 is Polycarbonate (PC). The thickness and the material of the insulation cover 2 greatly reduce a weight of the insulation cover 2, and thus improve an energy density of the battery pack; meanwhile, the insulation cover 2 is easy to form and convenient to assemble, thereby reducing cost.

What is claimed is:

1. A battery pack, comprising:
a plurality of battery modules, wherein each battery module comprises:
a battery row, comprising a plurality of battery cells arranged in a longitudinal direction, wherein each battery cell comprises two electrodes with opposite polarities, and electrodes of all battery cells of the battery row form two electrode rows arranging in the longitudinal direction;
a flexible printed circuit board, extending in the longitudinal direction and located between the two electrode rows of the battery row; and
two conductive connecting plate rows, located on two sides of the flexible printed circuit board in a transverse direction respectively, wherein each conductive connecting plate row comprises a plurality of conductive connecting plates arranged in the longitudinal direction and spaced apart from each other, and each conductive connecting plate of each conductive connecting plate row is electrically connected to the flexible printed circuit board and electrically connected to a corresponding electrode of a corresponding electrode row;
wherein each battery module further comprises:
an insulation cover, covering and fixed to a top of the battery row to insulate each battery module from outside; and
an insulation batten, extending in the longitudinal direction and fixed onto the flexible printed circuit board,
wherein each insulation cover is fixed onto a corresponding insulation batten, each insulation batten is located above the corresponding flexible printed circuit board, and the flexible printed circuit board is directly fixed to the top of the battery row,
each insulation batten comprises an inner recessed channel extending in the longitudinal direction of the insulation batten,
each insulation cover comprises two positioning slots located on two sides of the insulation cover in the longitudinal direction and recessed inward from side edges of the insulation cover, wherein each positioning slot is aligned with the inner recessed channel of a corresponding insulation batten,
each battery module further comprises: two positioning screws passing through two sides of the inner recessed channel of the insulation batten of the battery module in the longitudinal direction and fixed onto the flexible printed circuit board, wherein a top of each positioning screw protrudes from an upper surface of the insulation batten, and each positioning screw is engaged with a corresponding positioning slot of the insulation cover to position the insulation cover between corresponding two positioning screws.

2. The battery pack according to claim 1, wherein:
each insulation cover comprises a groove row, wherein the groove row is aligned with the inner recessed channel of a corresponding insulation batten and comprises a plurality of grooves arranged in the longitudinal direction and spaced apart from each other, and each groove is provided with a fixing hole extending through the groove in the up-down direction; and
each battery module further comprises a plurality of snapping members, and each snapping member passes through the fixing hole of a corresponding groove and is fixed to the insulation batten in a snap-fit manner.

3. The battery pack according to claim 2, wherein:
each insulation cover comprises two lateral edge parts located on two sides of the insulation cover in the transverse direction and extending outward and downward respectively, and the two lateral edge parts cover exteriors of two conductive connecting plate rows of a corresponding battery row.

4. The battery pack according to claim 3, wherein each insulation cover further comprises: a rear edge part, located at a rear side of the insulation cover in the longitudinal direction and extending outward and downward, wherein the rear edge part covers a rear side of a corresponding battery row in the longitudinal direction.

5. The battery pack according to claim 4, wherein:
the insulation cover further comprises a plurality of reinforcing recesses arranged in the longitudinal direction, and each reinforcing recess is located between two adjacent grooves of each groove row and recessed downward from an outer surface of the insulation cover.

6. The battery pack according to claim 1, wherein:
the insulation cover is fixed onto the corresponding insulation batten by an adhesive.

7. The battery pack according to claim 6, wherein:
each insulation cover comprises two lateral parts located on two sides of the insulation cover in the transverse direction and extending downward respectively, and the two lateral parts cover exteriors of two conductive connecting plate rows of a corresponding battery row.

8. The battery pack according to claim 1, wherein a thickness of the insulation cover is in a range of 0.25 mm to 1.0 mm.

9. The battery pack according to claim 1, wherein each insulation cover is separately formed from and directly fixed onto a corresponding insulation batten, and each insulation batten is located between the two electrode rows of the battery row in the transverse direction.

10. The battery pack according to claim 9, wherein each insulation cover is fixed onto the corresponding insulation batten by an adhesive or in a snap-fit manner.

11. The battery pack according to claim 1, wherein each insulation batten covers the corresponding flexible printed circuit board above it.

12. The battery pack according to claim 1, wherein an insulating substrate of the flexible printed circuit board is fixed to the top of the battery row.

\* \* \* \* \*